United States Patent Office 3,449,381
Patented June 10, 1969

3,449,381
19-OXO- AND 19-LOWER ALKYL-19-OXOAN-DROSTANE DERIVATIVES
Albert Bowers, Mexico City, Mexico, assignor to Syntex Corporation, Panama, Panama, a corporation of Panama
No Drawing. Filed June 12, 1962, Ser. No. 201,768
Int. Cl. C07c *169/24;* A61k *17/00*
U.S. Cl. 260—397.4       23 Claims The present invention relates to novel cyclopentanophenanthrene derivatives and to a process for the production thereof.

More particularly the present invention relates to 19-oxoandrostane compounds and to 19-lower alkyl derivatives thereof.

The novel compounds of the present invention are represented by the following formulas:

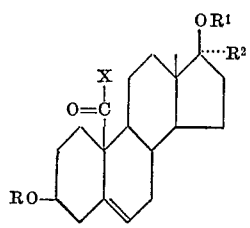
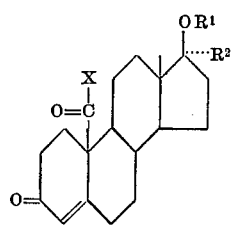
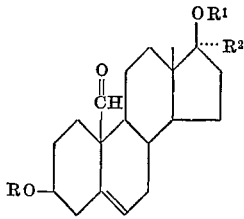
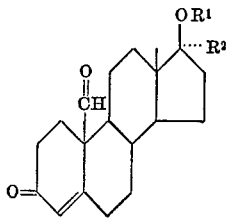

In the above formulas, R and $R^1$ each represent hydrogen or a hydrocarbon carboxylic acyl group of less than 12 carbon atoms; $R^2$ represents hydrogen, lower alkyl, lower alkenyl or lower alkinyl and X represents a lower alkyl group.

The acyl group is derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas exhibit anabolic-androgenic activity and inhibit the production of pituitary gonadotropic hormones and A.C.T.H. In addition, they have anti-estrogenic properties and lower the blood, liver and adrenal cholesterol levels. Furthermore, they are useful in the control of fertility and psychotic conditions and are appetite stimulants.

The novel 19-lower alkyl-19-oxo compounds of the present invention are prepared by the process illustrated as follows:

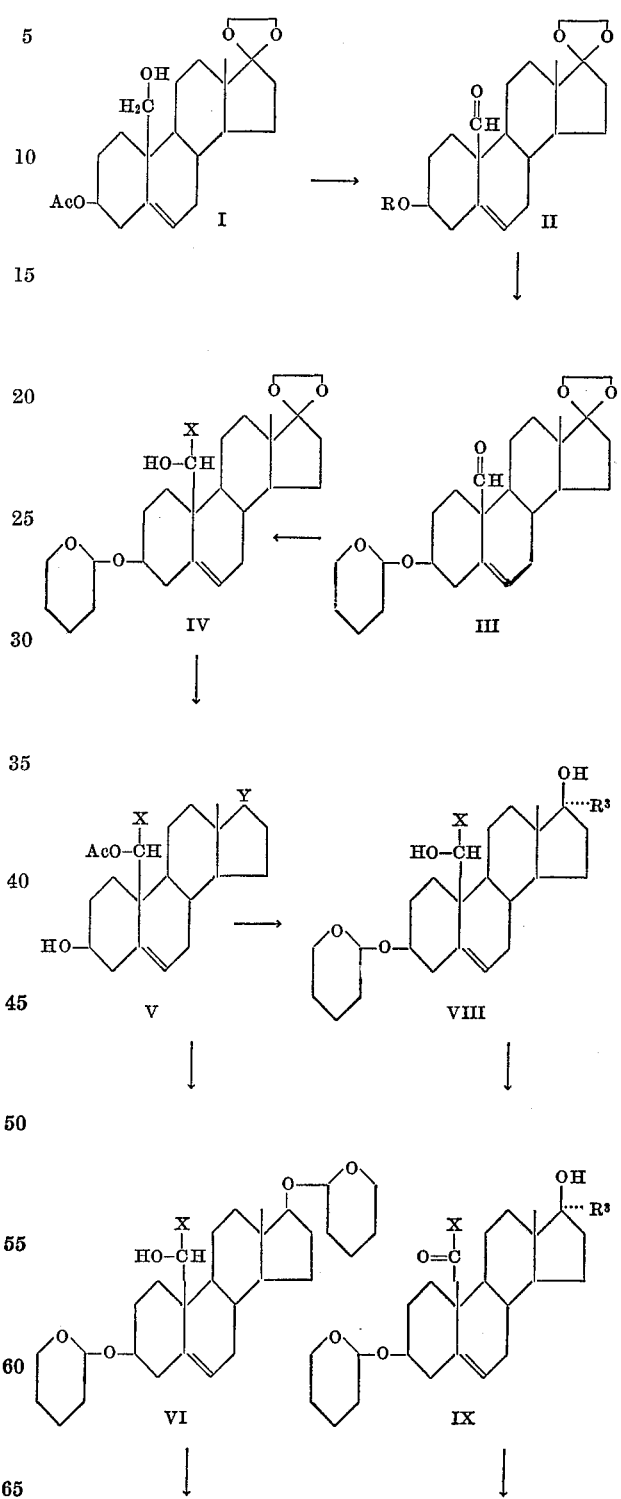

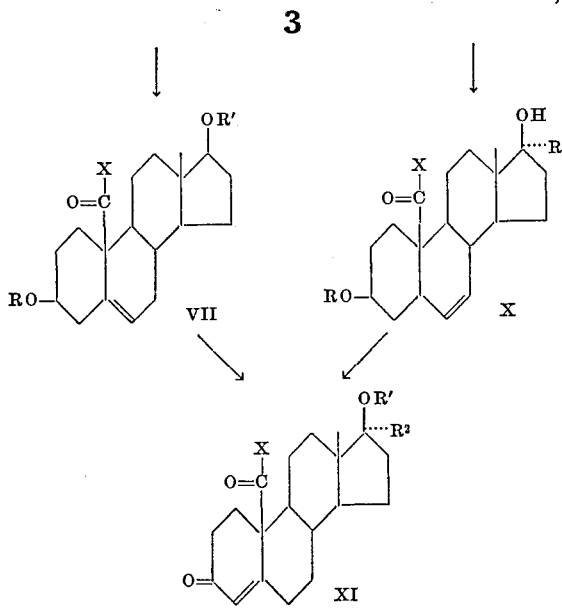

In the above formulas, R, $R^1$, $R^2$, and X have the same meaning as previously set forth; $R^3$ represents lower alkyl, lower alkenyl or lower alkinyl; Y represents keto or β-hydroxy; and Ac represents the acyl radical previously defined, preferably the acetyl group.

In practicing the process outlined above, $\Delta^5$-androstene-3β,19-diol-17-one 3-acetate is treated conventionally with ethylene glycol in the presence of p-toluenesulfonic acid to produce the 17-cycloethylenedioxy derivative thereof (I), which upon oxidation in a neutral or slightly basic medium, for example with chromium trioxide in pyridine, yields 17-cycloethylenedioxy-$\Delta^5$-androsten-3-β-ol-10-al acetate (II: R=acetyl). Concentional saponification of the latter in a basic medium affords the corresponding 3-free alcohol (II: R=hydrogen), which is treated with dihydropyrane in the presence of p-toulenesulfonic acid, under anhydrous conditions, to give the 3-tetrahydropyranylether of 17-cycloethylene-dioxy-$\Delta^5$-androsten-3β-ol-19-al (III). The last named compound is treated with a lowed alkyl magnesium bromide, such as methyl or ethyl magnesium bromide, to produce the 3-tetrahydropyranylether of the corresponding 17-cycloethylenedioxy-19-lower alkyl $\Delta^5$-androstene-3β,19-diol (IV), which upon conventional treatment in pyridine with an acylating agent, preferably acetic anhydride, gives the corresponding 19-acylate, preferably the 19-acetate, 3-tetrahydropyranylether of the corresponding 17-cycloethylenedioxy-19-lower alkyl-$\Delta^5$-androstene - 3β, 19-diol. Acid treatment of the latter yields the 19-acetate of the corresponding 19-lower alkyl-$\Delta^5$-androstene-3β,19-diol-17-one (V: Y=keto), which is reduced, preferably with sodium borohydride, to give the 19-acetate of the corresponding 19-lower alkyl-$\Delta^5$-androstene-3β,17β,19-triol (V: Y=hydroxyl).

The latter triol acetate is treated conventionally with dihydropyrane is the presence of p-toluenesulfonic acid to give the 3,17-bis-tetrahydropyranylether-19-acetate of the corresponding 19-lower alkyl-$\Delta^5$-androstene-3β,17β, 19-triol, which upon conventional saponification with a base, for example sodium or potassium hydroxide, yields the 3,17-bis-tetrahydropyranylether of the corresponding 19-lower alkyl-$\Delta^5$-androstene-3β,17β,19-triol (VI). The latter compound is oxidized in a neutral or slightly basic medium, for example with chromium trioxide in pyridine, to produce the 3,17-bis-tetrahydropyranylether of the corresponding 19-lower alkyl-$\Delta^5$-androstene-3β,17β-diol-19-one, which upon treatment with a mineral acid, for example hydrochloric acid, furnishes the corresponding 19-lower alkyl - $\Delta^5$ - androstene - 3β,17β - diol - 19 - one (VII: $R=R^1=H$).

The 19-lower alkyl-$\Delta^5$-androstene-3β,19-diol-17-one 19-acetate derivatives (V: Y=keto) are treated with dihydropyrane in the presence of p-toluenesulfonic acid to give the 3-tetrahydropyranylether-19-acetate of the corresponding 19-lower alkyl-$\Delta^5$-androstene-3β,19-diol-17-one compound, which upon reaction with a lower alkyl, lower alkenyl or lower alkinyl magnesium halide, such as methyl, vinyl or ethinyl magnesium bromide, in a suitable solvent inert to the reagent, such as ether or tetrahydrofuran, yields after concurrent hydrolysis of the 19-acetate grouping the 3-tetrahydropyranylether of the corresponding 17α-(lower alkyl, lower alkenyl or lower alkinyl) - 19-lower alkyl-$\Delta^5$-androstene-3β,17β,19-triol Compound VIII.

Upon oxidation of the 19-free hydroxyl group of the latter compound in a neutral or slightly basic medium, such as chomium trioxide in pyridine, there is obtained the 3-tetrahydropyranylether of the corresponding 17α-substituted - 19 - lower alkyl-$\Delta^5$-androstene-3β,17β-diol-19-one (IX), which upon conventional acid treatment gives the corresponding 17α-substituted-19-lower alkyl-$\Delta^5$-androstene-3β,17β-diol-19-one (X: $R=R^1=T$). The 3,17-diol-19-one derivatives of the present invention (VII, X) upon treatment under Oppenauer conditions for approximately 15 minutes, yield the corresponding 19-lower alkyl-$\Delta^4$-androsten-17β-ol-3,19-dione derivatives (XI).

The 19-oxo compounds of the present invention are produced by the process exemplified by the following scheme:

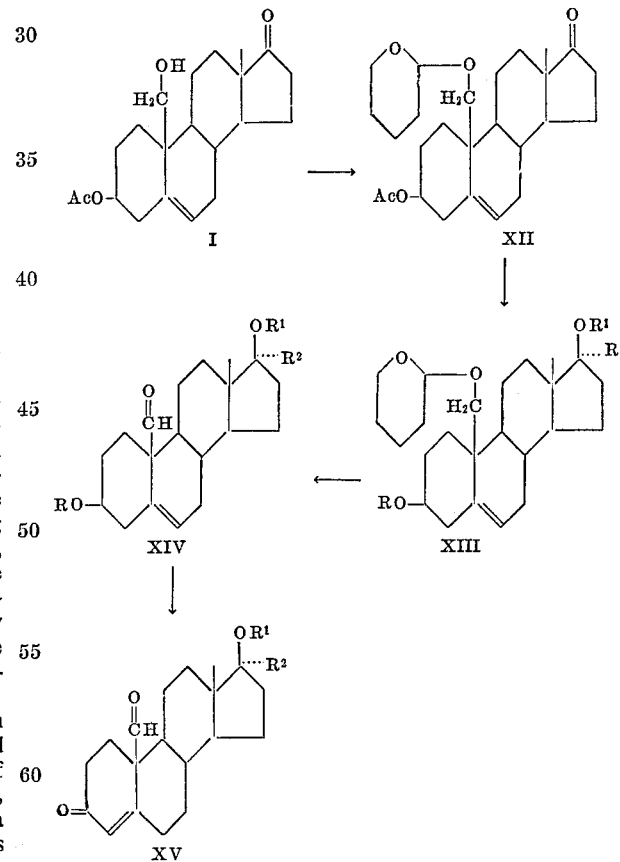

In the above formulas, Ac, R, $R^1$ and $R^2$ have the same meaning as hereinbefore defined.

In practicing the process just outlined, the starting $\Delta^5$-androstene-3β,19-diol-17-one 3-acetate (I) is treated conventionally with dihydropyrane under the above described conditions to give the 19-tetrahydropyranylether thereof (XII), which upon reaction with a lower alkyl, lower alkenyl or lower alkinyl magnesium halide in a suitable solvent inert to the reagents, yields the 19-tetrahydropyranylether of the corresponding 17-(lower alkyl, lower alkenyl or lower alkinyl)-$\Delta^5$-androstene-3β,17β,19-triol (XIII: $R^2$=hydrocarbon, R=H). Conventional acylation of the latter derivative in pyridine with acetic anhydride affords the corresponding 3-acetate (XIII: R=acetyl), the 19-tetrahydropyranylether group of which is conventionally hydrolyzed in an acid medium to give the corresponding 17a-lower (alkyl, alkenyl or alkinyl)-$\Delta^5$-androstene-3β,17β,19-triol 3-acetate. The latter compound is oxidized, preferably with chromium trioxide in pyridine, to give the corresponding 17α-lower (alkyl, alkenyl or alkinyl)-$\Delta^5$-androstene-3β,17β-diol-19-al 3 - acetate (XIV: $R^2$=H).

The tetrahydropyranylether 3-acetate of $\Delta^5$-androstene-3β,19-diol-17-one (XII) upon reduction, preferably with sodium borohydride in a suitable solvent such as tetrahydrofuran, yields the corresponding 19-tetrahydropyranylether 3-acetate of $\Delta^5$-androstene-3β,17β,19-triol, which is conventionally acetylated in pyridine to produce the corresponding 3,17-diacetate (XIII: R=$R^1$=acetyl, $R^2$=H). The latter compound is treated with a mineral acid to give the corresponding 19-free hydroxy compound which upon oxidation, preferably with chromium trioxide in pyridine, yields the diacetate of $\Delta^5$-androstene-3β,17β-diol-19-al (XIV: R=$R^1$=acetyl; $R^2$=H). The acetoxy groupings of the latter compound are conventionally hydrolyzed in a basic medium to give the corresponding 3β,17β-free diol (XIV: R=$R^1$=$R^2$=H).

The 3β,17β-diol-19-al derivatives set forth hereinbefore (XIV) are treated under conventional Oppenauer conditions for approximately 15 minutes to give the corresponding 17β-ol-19-al-3-one compounds (XV).

The secondary hydroxyl groups of the compounds of the present invention are conventionally esterified in pyridine with an acylating agent, such as an anhydride derived from hydrocarbon carboxylic acids of the above described type, to produce the corresponding secondary hydroxyl esters. The tertiary hydroxyl group of the said compounds are conventionally acylated in the presence of p-toluenesulfonic acid with an acylating agent, such as acetic anhydride or caproic anhydride, thus producing the corresponding tertiary hydroxyl acylates.

The following specific examples serve to illustrate but are not intended to limit the scope of the present invention:

EXAMPLE I

A mixture of 1 g. of the 3-acetate of $\Delta^5$-androstene-3β,19-diol-17-one (obtained in accordance with my copending U.S. patent application Serial No. 194,716 filed May 14, 1962, now U.S. Patent No. 3,065,228), 25 cc. of dry benzene, 5 cc. of ethylene glycol and 50 mg. of p-toluenesulfonic acid monohydrate was refluxed for 16 hours using a water separator. It was then washed with a sodium bicarbonate solution, then with water, and subsequently dried and evaporated to dryness. Recrystallization from acetone-hexane yielded 17-cycloethylenedioxy-$\Delta^5$-androstene-3β,19-diol 3-acetate.

EXAMPLE II

A solution of 6 g. of the latter compound in 120 cc. of pyridine was added to a mixture of 6 g. of chromic trioxide in 120 cc. of pyridine. The reaction mixture was kept at room temperature overnight. It was then diluted with ethyl acetate, filtered through Celite and the filtrate washed well wih water, dried and evaporated to dryness. Crystallization from acetone-hexane afforded 17-cycloethylenedioxy-$\Delta^5$-androsten-3β-ol-19-al acetate.

EXAMPLE III 2 g. of the latter acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 17-cycloethylenedioxy-$\Delta^5$-androsten-3β-ol-19-al.

EXAMPLE IV 2 cc. of dihydropyrane were added to a solution of 1 g. of the foregoing 3β-alcohol in 15 cc. of benzene and about 1 cc. was distilled to remove moisture. 0.4 gram of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3-tetrahydropyranylether of 17-cycloethylenedioxy-$\Delta^5$-androsten-3β-ol-19-al.

EXAMPLE V

A solution of 5 g. of the latter steroid in 250 cc. of thiophene-free benzene was treated with 27.5 cc. of 4 N methyl magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded the 3-tetrahydropyranylether of 17-cycloethylenedioxy-19-methyl-$\Delta^5$-androstene-3β,19-diol.

EXAMPLE VI

Following the procedure of the foregoing example, except that methyl magnesium bromide was substituted by ethyl magnesium bromide, there was obtained the 3 - tetrahydropyranylether of 17-cycloethylenedioxy-19-ethyl-$\Delta^5$-androstene-3β,19-diol.

EXAMPLE VII

A mixture of 1 g. of the 3-tetrahydropyranylether of 17-cycloethylenedioxy - 19 - methyl-$\Delta^5$-androstene-3β,19-diol, 4 cc. of pyridine and 2 cc. of acetic anhydride was kept at room temperature overnight, then poured into ice water. The thus-formed precipitate was filtered, washed with water and dried. Crystallization from acetone-hexane gave the 3-tetrahydropyranylether-19-acetate of 17-cycloethylenedioxy-19-methyl-$\Delta^5$-androstene-3β,19-diol.

The 3 - tetrahydropyranylether of 17-cycloethylenedioxy-19-ethyl-$\Delta^5$-androstene-3β,19-diol was treated by the same procedure, thus affording the 3-tetrahydropyranylether-19-acetate of 17-cycloethylenedioxy-19-ethyl-$\Delta^5$-androstene-3β,19-diol.

EXAMPLE VIII

A solution of 500 mg. of the 3-tetrahydropyranylether-19-acetate of 17-cycloethylenedioxy-19-methyl-$\Delta^5$-androstene-3β,19-diol in 25 cc. of acetone was treated with 1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave the 19-acetate of 19-methyl-$\Delta^5$-androstene-3β,19-diol-17-one.

The 3 - tetrahydropyranylether-19-acetate of 17-cycloethylenedioxy-19-ethyl-$\Delta^5$-androstene - 3β,19 - diol was treated by the same procedure, thus furnishing the 19-acetate of 19-ethyl-$\Delta^5$-androstene-3β,19-diol-17-one.

EXAMPLE IX

A solution of 2 g. of sodium borohydride in 30 cc. of methanol was added with stirring to a solution of 2 g. of the 19-acetate of 19-methyl-$\Delta^5$-androstene-3β,19-diol-17-one in 40 cc. of tetrahydrofuran. The mixture was kept at room temperature overnight, the excess reagent was decomposed by addition of acetic acid, the resulting solution concentrated to small volume in vacuo and diluted with water. The product was extracted with ethyl acetate, the extract washed with water, dried and evaporated. Crystallization of the solid from acetone-hexane gave the 19-acetate of 19-methyl-Δ5-androstene-3β,17β,19-triol.

The 19-acetate of 19-ethyl-Δ5-androstene-3β,19-diol-17-one was treated in accordance with the above procedure, thus furnishing the 19-acetate of 19-ethyl-Δ5-androstene-3β,17β,19-triol.

EXAMPLE X 2 cc. of dihydropyrane were added to a solution of 1 g. of the 19-acetate of 19-methyl-Δ5-androstene-3β,17β,19-triol in 15 cc. of benzene and about 1 cc. was distilled to remove moisture. 0.4 gram of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded the 3,17-bis-tetrahydropyranylether - 19 - acetate of 19-methyl-Δ5-androstene-3β,17β,19-triol.

The 19-acetate of 19-ethyl-Δ5-androstene-3β,17β,19-triol was treated by the same procedure to give the 3,17-bis-tetrahydropyranylether-19-acetate of 19-ethyl-Δ5-androstene-3β,17β,19-triol.

EXAMPLE XI

The 3,17-bis-tetrahydropyranylether-19-acetate of 19-methyl-Δ5-androstene-3β,17β,19-triol and the 3,17-bis-tetrahydropyranylether-19-acetatae of 19-ethyl-Δ5-androstene-3β,17β,19-triol were treated in accordance with Example III, giving respectively the 3,17-bis-tetrahydropyranylether of 19-methyl-Δ5-androstene-3β,17β,19-triol and the 3,17-bis-tetrahydropyranylether of 19-ethyl-Δ5-androstene-3β,17β,19-triol.

EXAMPLE XII

A solution of 6 g. of the 3,17-bis-tetrahydropyranylether of 19-methyl-Δ5-androstene-3β,17β,19-triol in 120 cc. of pyridine was added to a mixture of 6 g. of chromic trioxide in 120 cc. of pyridine. The reaction mixture was kept at room temperature overnight. It was then diluted with ethyl acetate, filtered through Celite and the filtrate washed well with water, dried and evaporated to dryness. Crystallization from acetone-hexane afforded the 3,17-bis-tetrahydropyranylether of 19 - methyl-Δ5-androstene-3β,17β-diol-19-one.

Following the same procedure, the 3,17-bis-tetrahydropyranylether of 19-ethyl-Δ5-androstene-3β,17β,19-triol was treated to give the 3,17-bis-tetrahydropyranylether of 19-ethyl-Δ5-androstene-3β,17β-diol-19-one.

EXAMPLE XIII

To a solution of 1 g. of the 3,17-bis-tetrahydropyranylether of 19-methyl-Δ5-androstene-3β,17β-diol-19-one in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded 19-methyl-Δ5-androstene-3β,17β-diol-19-one.

The 3,17-bis-tetrahydropyranylether of 19-ethyl-Δ5-androstene-3β,17β-diol-19-one was treated according to the above technique to give 19-ethyl-Δ5-androstene-3β,17β-diol-19-one.

EXAMPLE XIV

A mixture of 1 g. of 19-methyl-Δ5-androstene-3β,17β-diol-19-one, 4 cc. of pyridine and 2 cc. of acetic anhydride was kept at room temperature overnight, and poured into ice water. The thus-formed precipitate was filtered, washed with water and dried. Crystallization from acetone-hexane gave 19-methyl-Δ5-androstene-3β,17β-diol - 19 - one diacetate.

19-ethyl-Δ5-androstene-3β,17β-diol-19-one was treated by the same procedure to give 19-ethyl-Δ5-androstene-3β,17β-diol-19-one diacetate.

EXAMPLE XV

The starting compounds of the foregoing example were treated in accordance with that example, except that acetic anhydride was substituted by propionic anhydride, enanthic anhydride and undeceonic anhydride, thus affording respectively the corresponding dipropionates, dienanthalates, and diundecenoates.

EXAMPLE XVI

The 19-acetate of 19-methyl-Δ5-androstene-3β,19-diol-17-one and the 19-acetate of 19-ethyl-Δ5-androstene-3β,19-diol-17-one were treated in accordance with Example IV, giving respectively the 3-tetrahydropyranylether-19-acetate of 19-methyl-Δ5-androstene-3β,19-diol-17-one and the 3-tetrahydropyranylether-19-acetate of 19-ethyl-Δ5-androstene-3β,19-diol-17-one.

EXAMPLE XVII

A solution of 5 g. of the 3-tetrahydropyranylether-19-acetate of 19-methyl-Δ5-androstene-3β,19-diol-17-one in 250 cc. of thiophene-free benzene was treated with 27.5 cc. of 4 N methyl magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded the 3-tetrahydropyranylether of 17α,19-dimethyl-Δ5-androstene-3β,17β,19-triol.

The 3-tetrahydropyranylether-19-acetate of 19-ethyl-Δ5-androstene-3β,19-diol-17-one was treated by the same technique to give the 3-tetrahydropyranylether of 17α-methyl-19-ethyl-Δ5-androstene-3β,17β,19-triol.

EXAMPLE XVIII

The 3-tetrahydropyranylether-19-acetate of 19-methyl-Δ5-androstene-3β,19-diol-17-one and the 3-tetrahydropyranylether - 19-acetate of 19-ethyl-Δ5-androstene-3β-19-diol-17-one were treated in accordance with Example XVII, except that methyl magnesium bromide was substituted by vinyl magnesium bromide, thus affording respectively the 3-tetrahydropyranylether of 17α-vinyl-19-methyl-Δ5-androstene-3β,17β,19-triol and the 3-tetrahydropyranylether of 17α-vinyl-19-ethyl-Δ5-androstene-3β,17β,19-triol.

EXAMPLE XIX

The 3-tetrahydropyranylether-19-acetate of 19-methyl-Δ5-androstene-3β,19-diol-17-one and the 3-tetrahydropyranylether - 19 - acetate of 19-ethyl-Δ5-androstene-3β,19-diol-17-one were treated following the procedure described in Example XVII, but using ethinyl magnesium bromide instead of methyl magnesium bromide, thus furnishing respectively the 3-tetrahydropyranylether of 17α-ethinyl - 19-methyl-Δ5-androstene - 3β,17β,19-triol and the 3-tetrahydropyranylether of 17α-ethinyl-19-ethyl-Δ5-androstene-3β,17β,19-triol.

EXAMPLE XX

The starting compounds listed under A were treated in accordance with Example XII, thus giving the corresponding final compounds set forth under B.

| A | B |
|---|---|
| The 3-tetrahydropyranylether of 17α,19-dimethyl-Δ⁵-androstene-3β,17α,19-triol. | The 3-tetrahydropyranylether of 17α,19-dimethyl-Δ⁵-androstene-3β,17β-diol-19-one. |
| The 3-tetrahydropyranylether of 17α-methyl-19-ethyl-Δ⁵-androstene-3β,17α,19-triol. | The 3-tetrahydropyranylether of 17α-methyl-19-ethyl-Δ⁵-androstene-3β,17β-diol-19-one. |
| The 3-tetrahydropyranylether of 17α-vinyl-19-methyl-Δ⁵-androstene-3β,17α,19-triol. | The 3-tetrahydropyranylether of 17α-vinyl-19-methyl-Δ⁵-androstene-3β,17β-diol-19-one. |
| The 3-tetrahydropyranylether of 17α-vinyl-19-ethyl-Δ⁵-androstene-3β,17α,19-triol. | The 3-tetrahydropyranylether of 17α-vinyl-19-ethyl-Δ⁵-androstene-3β,17β-diol-19-one. |
| The 3-tetrahydropyranylether of 17α-ethinyl-19-methyl-Δ⁵-androstene-3β,17α,19-triol. | The 3-tetrahydropyranylether of 17α-ethinyl-19-methyl-Δ⁵-androstene-3β,17β-diol-19-one. |
| The 3-tetrahydropyranylether of 17α-ethinyl-19-ethyl-Δ⁵-androstene-3β,17α,19-triol. | The 3-tetrahydropyranylether of 17α-ethinyl-19-ethyl-Δ⁵-androstene-3β,17β-diol-19-one. |

EXAMPLE XXI

The final compounds of the foregoing example were treated in accordance with Example XIII, affording respectively 17α,19-dimethyl-Δ⁵-androstene-3β,17β-diol-19-one,
17α-methyl-19-ethyl-Δ⁵-androstene-3β,17β-diol-19-one,
17α-vinyl-19-methyl-Δ⁵-androstene-3β,17β-diol-19-one,
17α-vinyl-19-ethyl-Δ⁵-androstene-3β,17β-diol-19-one,
17α-ethinyl-19-methyl-Δ⁵-androstene-3β-17β-diol-19-one and
17α-ethinyl-19-ethyl-Δ⁵-androstene-3β,17β-diol-19-one.

EXAMPLE XXII

The final compounds of the foregoing example were treated in accordance with Example XIV, thus furnishing respectively 17α-19-dimethyl-Δ⁵-androstene-3β,17β-diol-19-one 3-acetate,
17α-methyl-19-ethyl-Δ⁵-androstene-3β,17β-diol-19-one 3-acetate,
17α-vinyl-19-methyl-Δ⁵-androstene-3β,17β-diol-19-one 3-acetate,
17α-vinyl-19-ethyl-Δ⁵-androstene-3β,17β-diol-19-one 3-acetate,
17α-ethinyl-19-methyl-Δ⁵-androstene-3β,17β-diol-19-one 3-acetate and
17α-ethinyl-19-ethyl-Δ⁵-androstene-3β,17β-diol-19-one 3-acetate.

EXAMPLE XXIII

To solution of 5 g. of 17α,19-dimethyl-Δ⁵-androstene-3β,17β-diol-19-one in 100 cc. of anhydrous benzene there were added 1 g. of p-toluenesulfonic acid and 10 cc. of caproic anhydride and the mixture was allowed to stand for 24 hours at room temperature, then poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 17α,19-dimethyl-Δ⁵-androstene-3β,17β-diol-19-one dicaproate.

Following the same procedure, there were treated the starting compounds listed under A, thus affording the products set forth under B.

| A | B |
|---|---|
| 17α-methyl-19-ethyl-Δ⁵-androstene-3β,17β-diol-19-one. | 17α-methyl-19-ethyl-Δ⁵-androstene-3β,17β-diol-19-one dicaproate. |
| 17α-vinyl-19-methyl-Δ⁵-androstene-3β,17β-diol-19-one. | 17α-vinyl-19-methyl-Δ⁵-androstene-3β,17β-diol-19-one dicaproate. |
| 17α-vinyl-19-ethyl-Δ⁵-androstene-3β,17β-diol-19-one. | 17α-vinyl-19-ethyl-Δ⁵-androstene-3β,17β-diol-19-one dicaproate. |
| 17α-ethinyl-19-methyl-Δ⁵-androstene-3β,17β-diol-19-one. | 17α-ethinyl-19-methyl-Δ⁵-androstene-3β,17β-diol-19-one dicaproate. |
| 17α-ethinyl-19-ethyl-Δ⁵-androstene-3β,17β-diol-19-one. | 17α-ethinyl-19-ethyl-Δ⁵-androstene-3β,17β-diol-19-one dicaproate. |

EXAMPLE XXIV

A solution of 1 g. of 19-methyl-Δ⁵-androstene-3β,17β-diol-19-one in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 15 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 19-methyl-Δ⁴-androsten-17β-ol-3,19-dione.

Following the same procedure, there were treated the starting compounds listed under A, thus affording the products set forth under B.

| A | B |
|---|---|
| 19-ethyl-Δ⁵-androstene-3β,17β-diol-19-one. | 19-ethyl-Δ⁴-androsten-17β-ol-3,19-dione. |
| 17α,19-dimethyl-Δ⁵-androstene-3β,17β-diol-19-one. | 17α,19-dimethyl-Δ⁴-androsten-17β-ol-3,19-dione. |
| 17α-methyl-19-ethyl-Δ⁵-androstene-3β,17β-diol-19-one. | 17α-methyl-19-ethyl-Δ⁴-androsten-17β-ol-3,19-dione. |
| 17α-vinyl-19-methyl-Δ⁵-androstene-3β,17β-diol-19-one. | 17α-vinyl-19-methyl-Δ⁴-androsten-17β-ol-3,19-dione. |
| 17α-vinyl-19-ethyl-Δ⁵-androstene-3β,17β-diol-19-one. | 17α-vinyl-19-ethyl-Δ⁴-androsten-17β-ol-3,19-dione. |
| 17α-ethinyl-19-methyl-Δ⁵-androstene-3β,17β-diol-19-one. | 17α-ethinyl-19-methyl-Δ⁴-androsten-17β-ol-3,19-dione. |
| 17α-ethinyl-19-ethyl-Δ⁵-androstene-3β,17β-diol-19-one. | 17α-ethinyl-19-ethyl-Δ⁴-androsten-17β-ol-3,19-dione. |

EXAMPLE XXV 19-methyl-Δ⁴-androsten-17β-ol-3,19-dione and 19-ethyl-Δ⁴-androsten-17β-ol-3,19-dione were treated in accordance with Example XIV, giving respectively 19-methyl-Δ⁴-androsten-17β-ol-3,19-dione acetate and 19-ethyl-Δ⁴-androsten-17β-ol-3,19-dione acetate.

EXAMPLE XXVI

The starting compounds listed under A were treated in accordance with Example XXIII, to produce the corresponding products set forth under B.

| A | B |
|---|---|
| 17α,19-dimethyl-Δ⁵-androsten-17β-ol-3,19-dione. | 17α,19-dimethyl-Δ⁴-androsten-17β-ol-3,19-dione caproate. |
| 17α-methyl-19-ethyl-Δ⁴-androsten-17β-ol-3,19-dione. | 17α-methyl-19-ethyl-Δ⁴-androsten-17β-ol-3,19-dione caproate. |
| 17α-vinyl-19-methyl-Δ⁴-androsten-17β-ol-3,19-dione. | 17α-vinyl-19-methyl-Δ⁴-androsten-17β-ol-3,19-dione caproate. |
| 17α-vinyl-19-ethyl-Δ⁴-androsten-17β-ol-3,19-dione. | 17α-vinyl-19-ethyl-Δ⁴-androsten-17β-ol-3,19-dione caproate. |
| 17α-ethinyl-19-methyl-Δ⁴-androsten-17β-ol-3,19-dione. | 17α-ethinyl-19-methyl-Δ⁴-androsten-17β-ol-3,19-dione caproate. |
| 17α-ethinyl-19-ethyl-Δ⁴-androsten-17β-ol-3,19-dione. | 17α-ethinyl-19-ethyl-Δ⁴-androsten-17β-ol-3,19-dione caproate. |

EXAMPLE XXVII

The starting compounds of the foregoing example were treated in accordance with Example XXIII, except that caproic anhydride was substituted by propionic anhydride an enanthic anhydride, thus affording respectively the corresponding propionates and enanthates.

EXAMPLE XXVIII

The 3-acetate of Δ⁵-androstene-3β,19-diol-17-one was treated in accordance with Example IV to produce the 19-tetrahydropyranylether-3-acetate of Δ⁵-androstene-3β,19-diol-17-one.

EXAMPLE XXIX

The latter steroid was treated in accordance with Examples XVII, XVIII and XIX yielding respectively the 19-tetrahydropyranylether of 17α-methyl-Δ⁵-androstene-3β,17β,19-triol, the 19-tetrahydropyranylether of 17α-vinyl-Δ⁵-androstene-3β,17β,19-triol and the 19-tetrahydropyranylether of 17α-ethinyl-Δ⁵-androstene-3β,17β,19-triol.

EXAMPLE XXX

The final products of the foregoing example were treated in accordance with Example XIV, giving respectively the 19-tetrahydropyranylether-3-acetate of 17α- methyl-Δ⁵-androstene-3β,17β,19-triol, the 19-tetrahydropyranylether-3-acetate of 17α-vinyl-Δ⁵-androstene-3β,17β,19-triol and the 19-tetrahydropyranylether-3-acetate of 17α-ethinyl-Δ⁵-androstene-3β,17β,19-triol.

EXAMPLE XXXI

The final compounds of Example XXX, were treated by the procedure described in Example XIII, yielding respectively the 3-acetate of 17α-methyl-Δ⁵-androstene-3β,17β,19-triol, the 3-acetate of 17α-vinyl-Δ⁵-androstene-3β,17β,19-triol and the 3-acetate of 17α-ethinyl-Δ⁵-androstene-3β,17β,19-triol.

EXAMPLE XXXII

The final compounds of the preceding example were treated in accordance with Example XII, thus affording respectively the 3-acetate of 17α-methyl-Δ⁵-androstene-3β,17β-diol-19-al, the 3-acetate of 17α-vinyl-Δ⁵-androstene-3β,17β-diol-19-al and the 3-acetate of 17α-ethinyl-Δ⁵-androstene-3β,17β-diol-19-al.

EXAMPLE XXXIII

The final compounds of the foregoing example were treated in accordance with Example XXIII, giving respectively the 3-acetate-17-caproate of 17α-methyl-Δ⁵-androstene-3β,17β-diol-19-al, the 3-acetate-17-caproate of 17α-vinyl-Δ⁵-androstene-3β,17β-diol-19-al and the 3-acetate - 17 - caproate of 17α-ethinyl-Δ⁵-androstene-3β,17β-diol-19-al.

EXAMPLE XXXIV

The final compounds of Example XXXII were treated in accordance with Example III, thus giving respectively 17α - methyl-Δ⁵-androstene-3β,17β-diol-19-al, 17α-vinyl-Δ⁵-androstene-3β,17β-diol-19-al and 17α-ethinyl-Δ⁵-androstene-3β,17β-diol-19-al.

EXAMPLE XXXV

The final compounds of Example XXXIV, were treated in accordance with Example XXIV, giving respectively 17α-methyl-Δ⁴-androsten-17β-ol-19-al-3-one, 17α - vinyl-Δ⁴ - androsten-17β-ol-19-al-3-one and 17α - ethinyl-Δ⁴-androsten-17β-ol-19-al-3-one.

EXAMPLE XXXVI

The final compounds of Example XXXV were treated in accordance with Example XXIII, yielding respectively 17α-methyl-Δ⁴-androsten-17β-ol-19-al-3-one caproate, 17α-vinyl - Δ⁴-androsten-17β-ol- 19-al-3-one caproate and 17α-ethinyl-Δ⁴-androsten-17β-ol-19-al-3-one.

EXAMPLE XXXVII

The final compounds of Example XXXV were treated in accordance with Example XXIII except that caproic anhydride was substituted by acetic anhydride, propionic anhydride and enanthic anhydride, thus furnishing respectively the corresponding acetates, propionates and enanthates.

EXAMPLE XXXVIII

The 19-tetrahydropyranylether-3-acetate of Δ⁵-androstene-3β,19-diol-17-one was successively treated in accordance with Examples IX, XIV, XIII, and XII, thus giving respectively the 19-tetrahydropyranylether-3-acetate of Δ⁵ - androstene-3β,17β,19-triol, the 19-tetrahydropyranylether-3,17-diacetate of Δ⁵-androstene-3β,17β,19-triol, the 3,17 - diacetate of Δ⁵-androstene-3β,17β,19-triol and the diacetate of Δ⁵-androstene-3β,17β-diol-19-al.

EXAMPLE XXXIX

The diacetate of Δ⁵ - androstene-3β,17β-diol-19-al was treated in accordance with Example III, to give Δ⁵-androstene-3β,17β-diol-19-al, which upon treatment according to Example XXIV, yielded Δ⁴-androsten-17β-ol-19-al-3-one.

EXAMPLE XL

The latter steroid was treated in accordance with Example XIV, thus giving the acetate of Δ⁴-androsten-17β-ol-19-al-3-one.

EXAMPLE XLI

Δ⁴-androsten-17β-ol-19-al-3-one was treated in accordance with Example XIV, except that acetic anhydride was substituted by propionic anhydride, caproic anhydride and enanthic anhydride, thus furnishing respectively the propionate, caproate and enanthate of Δ⁴-androsten-17β-ol-19-al-3-one.

I claim:
1. A compound of the following formula

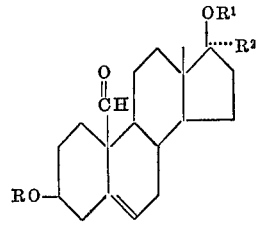

wherein R and R¹ are selected from the group consisting of hydrogen and a hydrocarbon carboxylic acyl group of less than 12 carbon atoms and R² is selected from the group consisting of hydrogen, lower alkyl, lower alkenyl and lower alkinyl.

2. Δ⁵-androstene-3β,17β-diol-19-al.
3. 17α-methyl-Δ⁵-androstene-3β,17β-diol-19-al.
4. 17α-vinyl-Δ⁵-androstene-3β,17β-diol-19-al.
5. 17α-ethinyl-Δ⁵-androstene-3β,17β-diol-19-al.
6. A compound of the following formula:

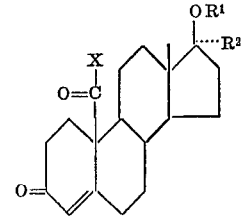

wherein R¹ is selected from the group consisting of hydrogen and a hydrocarbon carboxylic acyl group of less than 12 carbon atoms; R² is a member of the group consisting of hydrogen, lower alkyl, lower alkenyl and lower alkinyl and X is ethyl.

7. 19-ethyl-Δ⁴-androsten-17β-ol-3,19-dione.
8. 17α-methyl-19-ethyl-Δ⁴-androsten-17β-ol-3,19-dione.
9. A compound of the following formula:

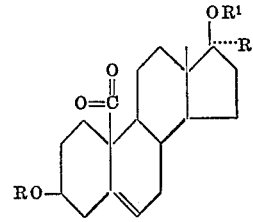

wherein R and R¹ are selected from the group consisting of hydrogen and a hydrocarbon carboxylic acyl group of less than 12 carbon atoms; R² is a member of the group consisting of hydrogen, lower alkyl, lower alkenyl and X is a lower alkyl group.

10. 19-methyl-Δ⁵-androstene-3β,17β-diol-19-one.
11. 19-ethyl-Δ⁵-androstene-3β,17β-diol-19-one.
12. 17α,19-dimethyl-Δ⁵-androstene-3β,17β-diol-19-one.
13. 17α - methyl-19-ethyl-Δ⁵-androstene-3β,17β-diol-19-one.
14. 17α - vinyl-19-methyl-Δ⁵-androstene-3β,17β-diol-19-one.
15. 17α - vinyl - 19-ethyl-Δ⁵-androstene-3β,17β-diol-19-one.

16. 17α - ethinyl-19-methyl-Δ⁵-androstene-3β,17β-diol-19-one.

17. 17α - ethinyl-19-ethyl-Δ⁵-androstene-3β,17β,diol-19-one 18. 17α-lower alkenyl-Δ⁴-androsten-17β-ol-19-al-3-one.

19. A 17 - acylate of 17α-lower alkenyl-Δ⁴-androsten-17β-ol-19-al-3-one wherein the acyl group is a hydrocarbon carboxylic acyl group of less than 12 carobn atoms.

20. 17α-lower alkinyl-Δ⁴-androsten-17β-ol-19-al-3-one.

21. A 17 - acylate of 17α-lower alkinyl-Δ⁴-androsten-17β-ol-19-al-3-one wherein the acyl group is a hydrocarbon carboxylic acyl group of less than 12 carbon atoms.

22. A compound selected from the group consitsing of compounds of the formula

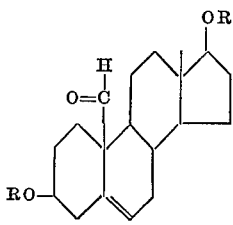

in which R is the same and selected from the group consisting of H and acetyl.

23. A compound of the formula

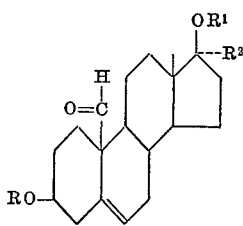

in which R and R¹ represent a member selected from the group consisting of hydrogen and a hydrocarbon carboxylic acyl group of less than 12 carbon atoms and R² is selected from the group consisting of lower alkenyl and lower alkinyl.

References Cited

UNITED STATES PATENTS 3,014,931   12/1961   Nishikawa et al. ____ 260—397.1

ELBERT L. ROBERTS, Primary Examiner.

U.S. Cl. X.R.

260—239.55, 397.5, 999

UNITED STATES PATENT OFFICE
CERTIFICATE OF CORRECTION

Patent No. 3,449,381  Dated June 10, 1969

Inventor(s) ALBERT BOWERS

It is certified that error appears in the above-identified patent and that said Letters Patent are hereby corrected as shown below:

Column 3, lines 1-11, in Formula X, the portion of the formula reading

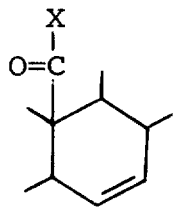   should read   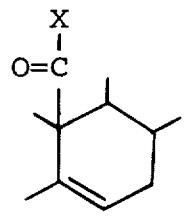

Column 4, line 20, in the definition "$R=R^1=T$", the "T" should be -- H --.
Column 10, line 41, "$\Delta^5$", should be -- $\Delta^4$ --.
Column 12, lines 51-60, that portion of the formula reading

   should read   

Column 13, line 7, "carobn" should be -- carbon --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents